(12) United States Patent
Khalil et al.

(10) Patent No.: US 9,866,884 B2
(45) Date of Patent: Jan. 9, 2018

(54) SOCIAL TELEVISION SYSTEM

(71) Applicant: Verizon Patent and Licensing Inc., Basking Ridge, NJ (US)

(72) Inventors: Manah M. Khalil, Coppell, TX (US); Omar A. Abou-Khamis, Irving, TX (US); Vijaya R. Challa, Irving, TX (US); Anil K. Guntupalli, Irving, TX (US); Mazen Hammad, Irving, TX (US); Amar Nageswaram, Irving, TX (US); Saivivek Thiyagarajan, Ashburn, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 16 days.

(21) Appl. No.: 14/249,661

(22) Filed: Apr. 10, 2014

(65) Prior Publication Data
US 2015/0296242 A1  Oct. 15, 2015

(51) Int. Cl.
| H04N 21/258 | (2011.01) |
| H04N 21/478 | (2011.01) |
| H04N 21/262 | (2011.01) |
| H04N 21/41 | (2011.01) |
| H04N 21/4784 | (2011.01) |

(52) U.S. Cl.
CPC . H04N 21/25816 (2013.01); H04N 21/26283 (2013.01); H04N 21/4104 (2013.01); H04N 21/4781 (2013.01); H04N 21/4784 (2013.01)

(58) Field of Classification Search
CPC .......... H04N 21/4532; H04N 21/4788; H04N 21/4668; H04N 21/812; H04N 21/4667; H04N 21/4312; H04N 21/4722; H04N 21/8133; H04N 21/47214; H04N 21/4821; H04N 21/4826; H04N 21/4828; H04N 21/4126; H04N 21/435; H04N 21/8173; H04N 21/25816; H04N 21/26283; H04N 21/4104; H04N 21/4781; H04N 21/4784; G06F 3/0482; G06F 17/3053; G06F 17/30867
USPC ....................................................... 725/25
See application file for complete search history.

(56) References Cited

U.S. PATENT DOCUMENTS

| 6,388,714 | B1 * | 5/2002 | Schein et al. ................. 348/563 |
| 7,296,284 | B1 * | 11/2007 | Price ................ G06F 17/30828 |
| | | | 348/563 |
| 7,788,686 | B1 * | 8/2010 | Andrews ......................... 725/32 |
| 2002/0188959 | A1 * | 12/2002 | Piotrowski .................... 725/112 |
| 2004/0088729 | A1 * | 5/2004 | Petrovic et al. ................ 725/91 |
| 2004/0205810 | A1 * | 10/2004 | Matheny et al. ............... 725/23 |
| 2006/0064734 | A1 * | 3/2006 | Ma ................................ 725/136 |
| 2007/0250901 | A1 * | 10/2007 | McIntire et al. ............. 725/146 |

(Continued)

*Primary Examiner* — Nathan Flynn
*Assistant Examiner* — Cynthia Fogg

(57) ABSTRACT

A method includes receiving a request associated with a secondary event orchestrator to schedule a secondary event to be concurrently broadcast with a primary video program. The secondary event is based on the primary video program. The method includes scheduling, by a processing device, the secondary event in an interactive media guide (IMG). The method also includes receiving requests or subscriptions for the secondary event from at least one user device based on the scheduled secondary event in the IMG, and providing support for the concurrent broadcast of the secondary event.

20 Claims, 13 Drawing Sheets

(56) References Cited

U.S. PATENT DOCUMENTS

| | | | |
|---|---|---|---|
| 2008/0016529 A1* | 1/2008 | Kitagawa | H04N 7/17318 725/39 |
| 2008/0092164 A1* | 4/2008 | Agarwal | H04N 7/17318 725/40 |
| 2008/0092201 A1* | 4/2008 | Agarwal | H04N 7/17318 725/135 |
| 2008/0155588 A1* | 6/2008 | Roberts et al. | 725/34 |
| 2009/0007178 A1* | 1/2009 | Artom | G11B 27/105 725/40 |
| 2009/0092374 A1* | 4/2009 | Kulas | H04N 7/173 386/248 |
| 2009/0187825 A1* | 7/2009 | Sandquist et al. | 715/719 |
| 2010/0142915 A1* | 6/2010 | McDermott et al. | 386/68 |
| 2010/0153520 A1* | 6/2010 | Daun et al. | 709/218 |
| 2011/0103763 A1* | 5/2011 | Tse | H04N 5/44543 386/201 |
| 2011/0307931 A1* | 12/2011 | Shuster | G06F 17/30817 725/105 |
| 2013/0198642 A1* | 8/2013 | Carney et al. | 715/738 |
| 2013/0222597 A1* | 8/2013 | Brink | G06Q 30/0211 348/157 |
| 2014/0053223 A1* | 2/2014 | Vorobyov et al. | 725/110 |
| 2014/0089322 A1* | 3/2014 | Garcia et al. | 707/748 |
| 2014/0223464 A1* | 8/2014 | Moran | H04N 21/4788 725/12 |
| 2014/0282677 A1* | 9/2014 | Mantell | H04N 21/4722 725/23 |

* cited by examiner

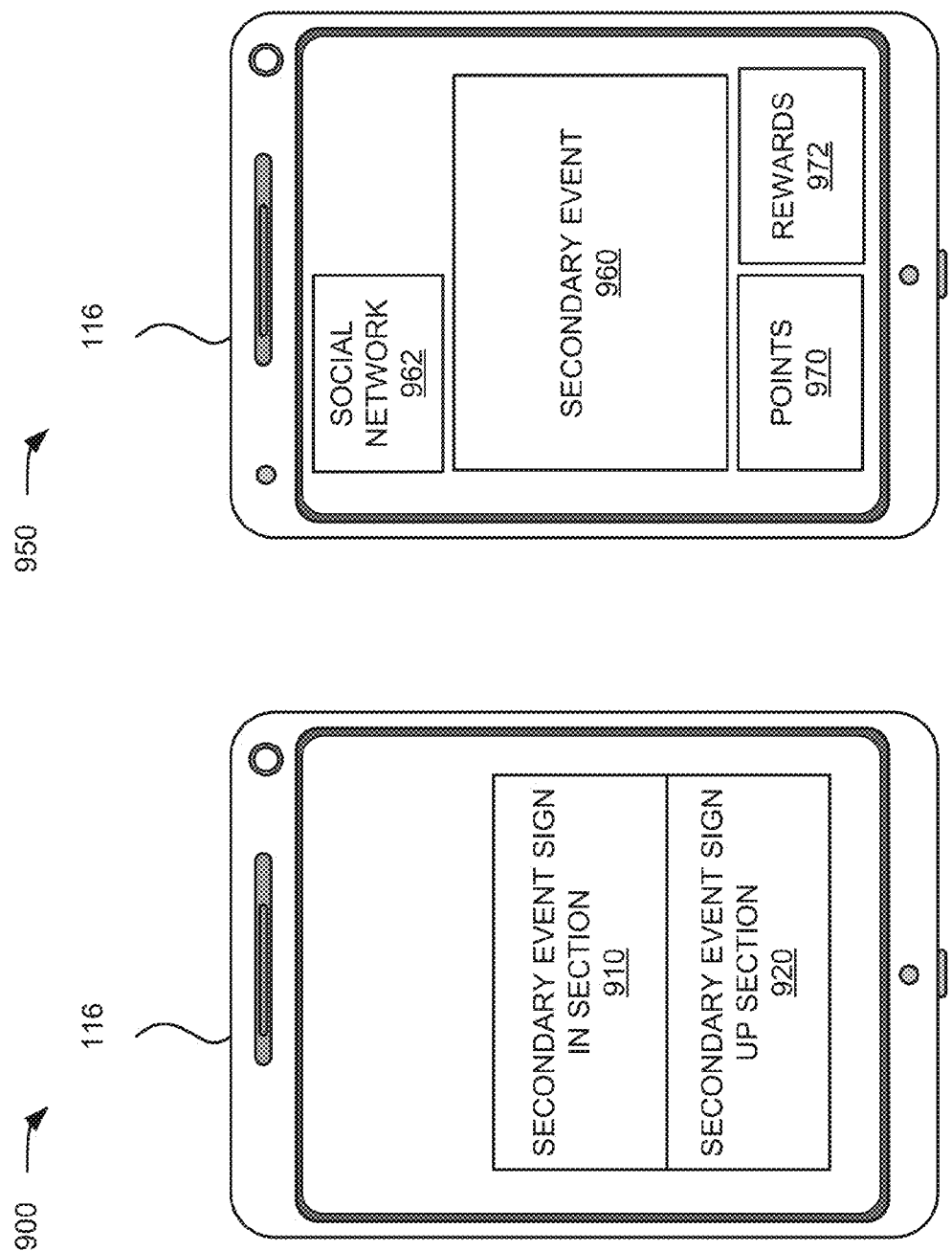

SOCIAL TELEVISION SYSTEM

BACKGROUND

As content is received, viewed or listened to at home on a first device (e.g., set top box and television, computer, etc.), another computing device (e.g. tablet, PDA, or another computer, etc.) may be used concurrently. Second screen applications may allow a service provider to provide secondary content that is related to the primary content. The first device may display primary content while the second computing device may display secondary content.

BRIEF DESCRIPTION OF THE DRAWINGS

FIGS. 9A-9B are exemplary second screen social television user interfaces;

DETAILED DESCRIPTION OF PREFERRED EMBODIMENTS

The following detailed description refers to the accompanying drawings. The same reference numbers in different drawings may identify the same or similar elements.

Systems and/or methods described herein may provide a capability for secondary event orchestrators to orchestrate secondary events that may be displayed on secondary devices and synchronize the provisioning of secondary events with primary video programs that are distributed through a video service provider. The secondary event orchestrator may be a third party entity that is separate from the video service provider. The primary video programs may include scheduled video content provided by the video service provider. The primary video program may be displayed on first screen devices, such as a television that receives a signal from the video service provider via a set top box. The secondary events may be displayed on second screen devices that receive the secondary events in coordination with receipt of the primary events at a primary device. In other implementations, the secondary events may be embedded in the primary video program.

The systems may combine social networks, gaming strategies, tablets and mobile devices to create new revenue streams while augmenting user experience before, during and after live and pre-recorded events. The systems may provide for integration of secondary event information into a video program guide associated with the service provider and video programs that may be displayed on the first screen devices. The secondary event orchestrator may publish the secondary event via the service provider to other customers of the service provider and to the wider public. The systems may allow the secondary event orchestrators to provide rewards to customers of the video service provider that interact with the secondary events. The systems may provide a ranking of the secondary event orchestrators that may be accessed via the video program guide.

The secondary events may include games, polls and information based on the primary video programs. The secondary events may include a presentation, a video, etc., that is determined based on the primary video program. The secondary events may be integrated within the service provider system via coordinated distribution of primary content and the secondary events. Points may be earned and rewards may be distributed based on the secondary events. The rewards may include access to video service provided by the service provider. Predetermined timing signals for distribution of secondary content and rewards may be generated and enforced via systems associated with and (in some instances, directly) controlled by the service provider.

Figure 1:
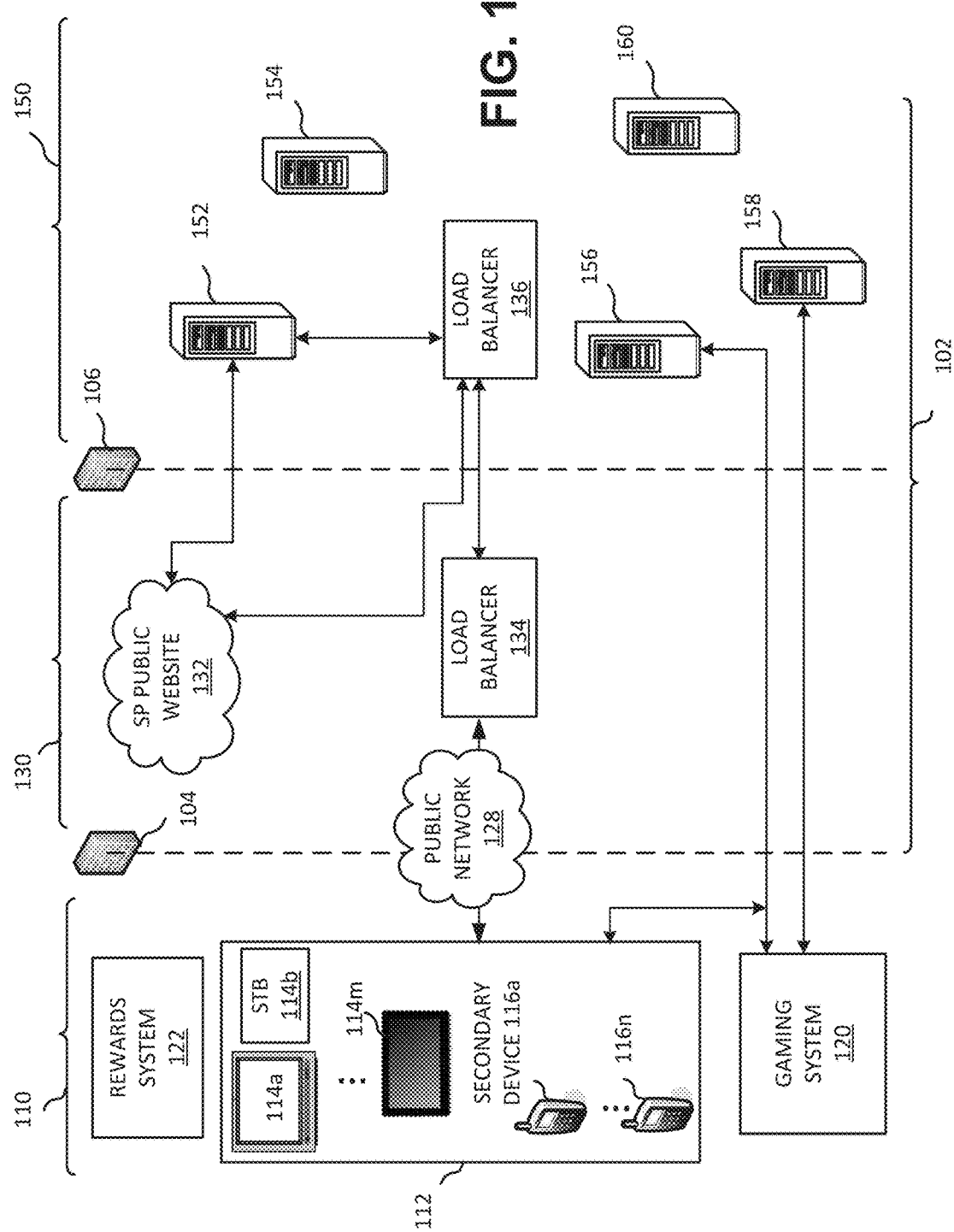
FIG. 1 is a diagram of an exemplary network in which systems and/or methods described herein may be implemented.

FIG. 1 is an exemplary environment 100 (also referred to as network 100) in which systems and/or methods described herein may be implemented. Environment 100 may be implemented to provide primary content associated with a video service provider and second screen content via a secondary event orchestrator. As illustrated, environment 100 may be segmented into different zones based on firewalls (firewalls 104, 106) that provide varying levels of access and security to the service provider system 102. The zones may include a public zone 110, an external zone 130 and an internal zone 150. Although FIG. 1 shows exemplary components of environment 100, in other implementations, environment 100 may contain fewer components, different components, differently arranged components, or additional components than depicted in FIG. 1.

Service provider system 102 may include devices in the external zone 130 and internal zone 150 that provide video services to customers or consumers that have registered accounts with the service provider. Service provider system 102 may also provide support and billing for the video service as well as social television services. Social television services include secondary events that may be published via (or in association with) the service provider system 102 to customers of the service provider based on subscriptions or to the wider public based on a restricted access/reduced functionality model or a paid subscription model. Secondary events may include secondary content based on primary video programs that may be scheduled and distributed in association with the primary video programs. Secondary events may be applied in educational, enterprise, political programs, entertainment shows, shopping channels.

The public zone 110 may include public networks and entities that may interface with a service provider system to receive video services from the service provider. For example, the public zone may include user devices 112 (including primary devices 114a-m and a secondary devices 116a-n, referred to in singular, in general, as user device 112

(or alternatively client device 112), and in plural as user devices 112), gaming system 120, rewards system 122, and public networks 128.

User devices 112 may enable a user to view video content or interact with another user device 112 or a video display device (e.g., a set-top box and/or television). User devices 112 may include, for example, a personal communications system (PCS) terminal (e.g., a smartphone that may combine a cellular radiotelephone with data processing and data communications capabilities), a tablet computer, a personal computer, a laptop computer, a personal digital assistant (PDA), a gaming console, a music playing device, a television, a display, an Internet television, or other types of computation or communication devices. In one implementation, user devices 112 may include client-side applications that enables each user device 112 to communicate with, for example, service provider system 102 and/or present information received from service provider system 102 to a user. Client-side applications may permit a user of user device 112 to log into an account (or otherwise authenticate the user) and access video content from the video service provider. User devices 112 may include primary devices 114 and secondary devices 116.

Primary devices 114 (shown in FIG. 1 as primary devices 114a-114m) may include user devices 112 that receive primary video content from the service provider. For example, primary devices 114 may include single device (such as a computer, a television with a cable card, etc.) or a combination of devices (such as a set top box and connected television). Primary devices 114 may receive a video service (e.g., a subscription cable service) via a cable network, satellite network, etc. The video service may include scheduled video programs that include content at particular times. The schedule of content for the video programs may be accessed via a media guide.

Secondary devices 116 (shown in FIG. 1 as secondary devices 116a-116n) may include user devices 112 that may receive a secondary content from the service provider. Secondary devices may receive secondary events that include particular secondary content and are determined based on primary video programs. Secondary content may include content that is determined based on the primary video programs and distributed to the secondary devices 116. The secondary content may displayed concurrently on the secondary device 116 as the primary video program is displayed on the primary device 114 (or the secondary content may be displayed within a particular time span of the display of the corresponding primary video program on the primary device 114 device). Secondary devices 116 may receive secondary content via the cable network. Alternatively, secondary devices 116 may receive the secondary content via a network that is different than the networks that deliver the primary video program to the primary device 114.

Gaming system 120 may include a system that provides gaming functionality and a gaming platform that may be used to distribute (and/or incorporate within primary video program as) secondary content. Games may include polls, interactive games, etc., that a user may play (or otherwise interact with) on a user device 112 in association with a primary video program. The games may be distributed as secondary content. Games may include interactive events (or secondary events) that end users may interact with in association with primary video programs. Games may be associated with a portion or segments of a video program or with the entire video program. For example, gaming system 120 may provide a capability for user devices 112 associated with the service provider system 102 to access, and in some instances set up or control, gaming functionality. Gaming system 120 may include a system that is external to the service provider system 102. Gaming system 120 may be operated by an entity that is independent from the service provider and exchanges information regarding customers in a manner that protects customer data (e.g., a federated system).

Rewards system 122 may include a system that provides rewards functionality and a rewards platform that may be used to distribute (and/or incorporate within primary video program as) rewards based on the secondary content. Rewards may include points for correct answers that may be redeemed for gifts associated with the service provider system 102 (gift card, access to premium content or pay per view event). For example, rewards system 122 may provide a capability for user devices 112 associated with the service provider system 102 to access, and in some instances set up or control, rewards functionality. Rewards system 122 may include a system that is external to the service provider system 102. Rewards system 122 may be operated by an entity that is independent from the service provider (and from gaming system 120) and exchanges information regarding customers in a manner that protects customer data (e.g., a federated system).

Network (or networks) 128 may include a local area network (LAN), a wide area network (WAN), a metropolitan area network (MAN), a telephone network, such as the Public Switched Telephone Network (PSTN), a cellular network, a Wi-Fi network, an intranet, the Internet, an optical fiber (or fiber optic)-based network, or a combination of networks. Devices using networks 128 may be connected via wired (e.g., Ethernet, coaxial cable, etc.), wireless connections (e.g., using network devices such as those available under the IEEE 802.11 wireless LAN standards) and/or optical connections.

External zone 130 may contain and expose external-facing services provided by the service provider to larger and untrusted network, such as the Internet. External zone 130 may include service provider (SP) public website 132 and a load balancer 134 (e.g., a content services switch (CSS)) that may route communications between the external users, service provider system 102 and SP public website 132.

SP public website 132 may include a website operated by the service provider. SP public website 132 may be hosted in a portion of service provider system 102 that is accessible via a first level of security (e.g., including firewall 104). SP public website 132 may provide information regarding customer accounts for video service provided to customers at primary devices 114 and secondary devices 116 by the service provider. SP public website 132 may also provide information regarding secondary content and secondary events to users (including, in some instances, the general public).

Internal zone 150 of service provider system 102 may include devices and internal processes executed by the service provider that are shielded from larger and untrusted networks, such as the Internet. As shown in FIG. 1, internal zone 150 may include, among other devices, a load balancer 136 (e.g., a CSS load balancer), an application server 152, a database server 154, a social television support server 156, a social television integrated media guide (IMG) server 158 and a profile server 160.

Application server 152 may support client side applications at user devices 112 that may be used to access video services. Application server 152 may provide (e.g., to user device 112 via the video companion application) video program related items based on requests provided by user devices 112. For example, a user may request a particular video program related item via a GUI on user device 112. Application server 152 may receive the request and identify corresponding video program related items that fulfill the particular request. Application server 152 may fulfill the request by providing the video program related items to particular devices, such as a requesting user device 112, an indicated set top box (STB) 114, or other indicated devices, based on user instructions included in the request.

Database server 154 may include a server or computing device that stores information regarding the video service and social television service (including in a transmission control protocol (TCP)/Internet protocol (IP) accessible format). Database server 154 may include a structured query language (SQL) server. Database server 154 may include automatic replication functionality that allows database server 154 to store information in redundant locations.

Social television support server 156 may include a computing device and/or server that supports social television services provided to users in association with the service provider. Social television services may include the integration of primary video programs, secondary events based on the primary video programs, and a social network community. Social television service may allow an end user to publish content associated with a primary video program as a secondary event as described below with respect to FIG. 4. The end user may be a secondary event orchestrator that controls (e.g., acts as a master of ceremonies) secondary events which may be displayed on secondary devices 116. Social television support server 156 may support cloud-based applications for multiple publishers, and multiple subscribers to the social television service. Social television server 156 may support lag-avoidance content delivery mechanism as described below with respect to FIG. 4.

Social television IMG server 158 may refer to any device or combination of devices configured to provide media guide information to user device 112 via network 128. Social television IMG server 158 may provide program guide data (IMG Data) associated with television or other multi-media programming to user devices 112. Social television IMG server 158 may integrate secondary event data including scheduled secondary events and identification of hosting entities for the secondary events.

Profile server 160 may store user profile information for users (e.g., users of user devices 112). Profile server 160 may perform as an intermediary for authentication purposes, such as described below with respect to FIG. 13. The user profile information may include, got example, login information (e.g., a user identifier and a password), targetable information associated with the user (e.g., types of products purchased by the user, income of the user, household characteristics, whether the user is a pet owner, etc.), demographic information, billing information, address information (including zip codes), types of services to which the user has subscribed, a list of video content purchased by the user, a list of video content rented by the user, a list of channels or video content to which the user has subscribed, a list of users associated with the user account, ratings of video content by the user, a user device identifier (e.g., a media player identifier, a mobile device identifier, a set top box identifier, a personal computer identifier) for devices associated with a user or household, such as primary devices 114, secondary devices 116, etc.

The particular arrangement and number of components of environment/network 100 shown in FIG. 1 are illustrated for simplicity. In practice there may be more application servers 152, database servers 154, social television support servers 156, social television IMG servers 158, profile servers 160 and/or networks 128. Components of network 100 may be connected via wired and/or wireless links.

Although not shown, internal zone 150 may include additional servers and other devices that provide and support video services offered by the service provider. The internal service provider network may include a video content management system (VCMS), a data center, a profile server, a billing server, a customer support system, and additional networks.

Figure 2:
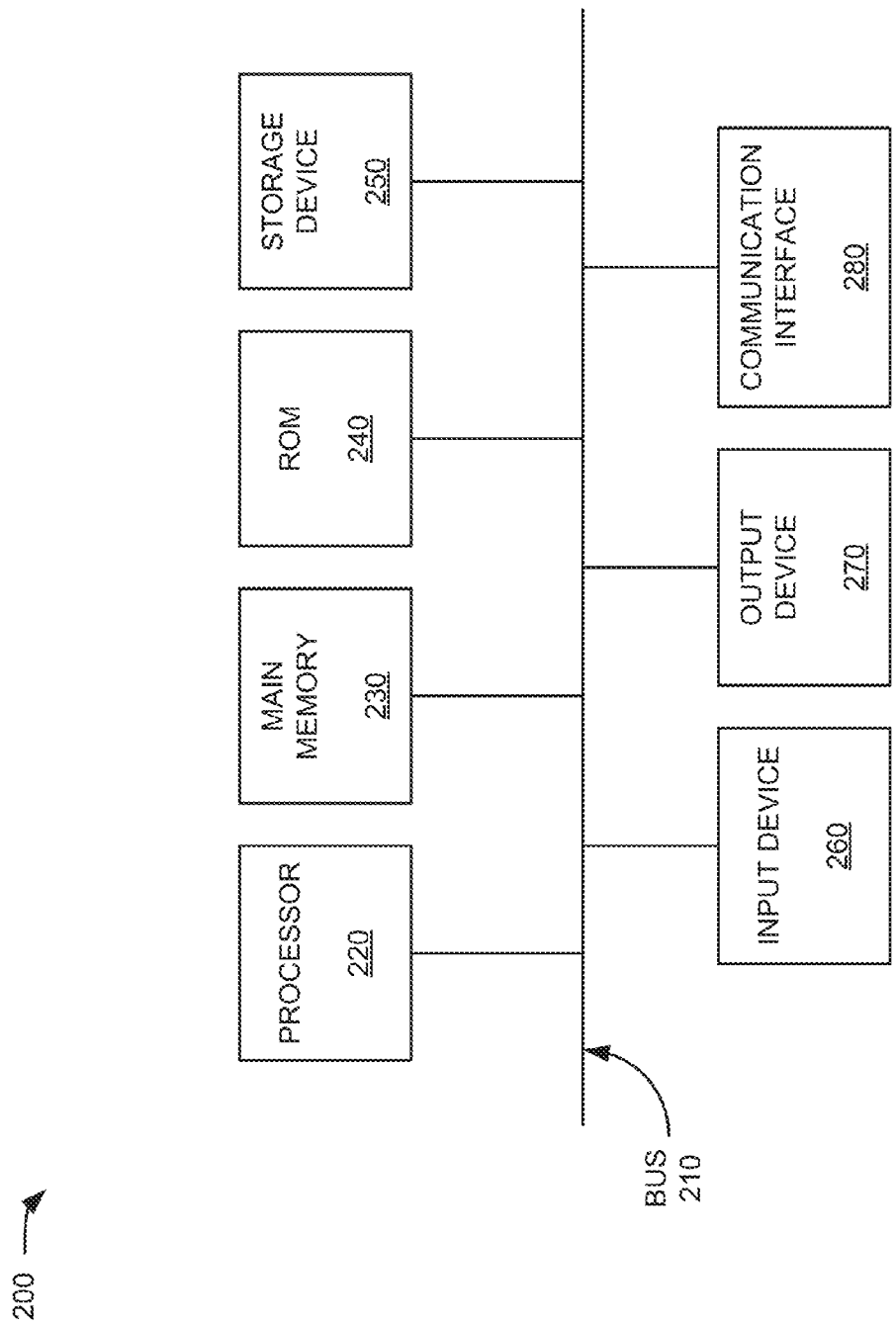
FIG. 2 is a diagram of exemplary components of one or more devices of the environment depicted in FIG. 1.

FIG. 2 is a diagram of exemplary components of a device 200 that may correspond to one or more devices of environment 100, such as user devices 112 (including primary devices 114 and secondary devices 116), gaming system 120, rewards system 122, load balancers (134 and 136), application server 152, database server 154, social television support server 156, social television IMG server 158 and/or profile server 160. As illustrated, device 200 may include a bus 210, a processor 220, a main memory 230, a read-only memory (ROM) 240, a storage device 250, an input device 260, an output device 270, and a communication interface 280. Bus 210 may include a path that permits communication among the components of device 200.

Processor 220 may include one or more processors, microprocessors, or other types of processing units that may interpret and execute instructions. Main memory 230 may include a random access memory (RAM) or another type of dynamic storage device that may store information and instructions for execution by processor 220. ROM 240 may include a ROM device or another type of static storage device that may store static information and/or instructions for use by processor 220. Storage device 250 may include a magnetic and/or optical recording medium and its corresponding drive.

Input device 260 may include a mechanism that permits an operator to input information to device 200, such as a remote control, control buttons, a keyboard, a mouse, a pen, a microphone, voice recognition and/or biometric mechanisms, a touch screen, etc. Output device 270 may include a mechanism that outputs information to the operator, including a display, an indicator light, a speaker, etc. Communication interface 280 may include any transceiver that enables device 200 to communicate with other devices and/or systems. For example, communication interface 280 may include mechanisms for communicating with another device or system via a network.

As described herein, device 200 may perform certain operations in response to processor 220 executing software instructions contained in a computer-readable medium, such as main memory 230. A computer-readable medium may be defined as a non-transitory memory device. A memory device may include space within a single physical memory device or spread across multiple physical memory devices. The software instructions may be read into main memory 230 from another computer-readable medium, such as storage device 250, or from another device via communication interface 280. The software instructions contained in main memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer components, different components, differently arranged components, or additional components than depicted in FIG. 2. In still other implementations, one or more components of device 200 may perform one or more other tasks described as being performed by one or more other components of device 200.

Figure 3:
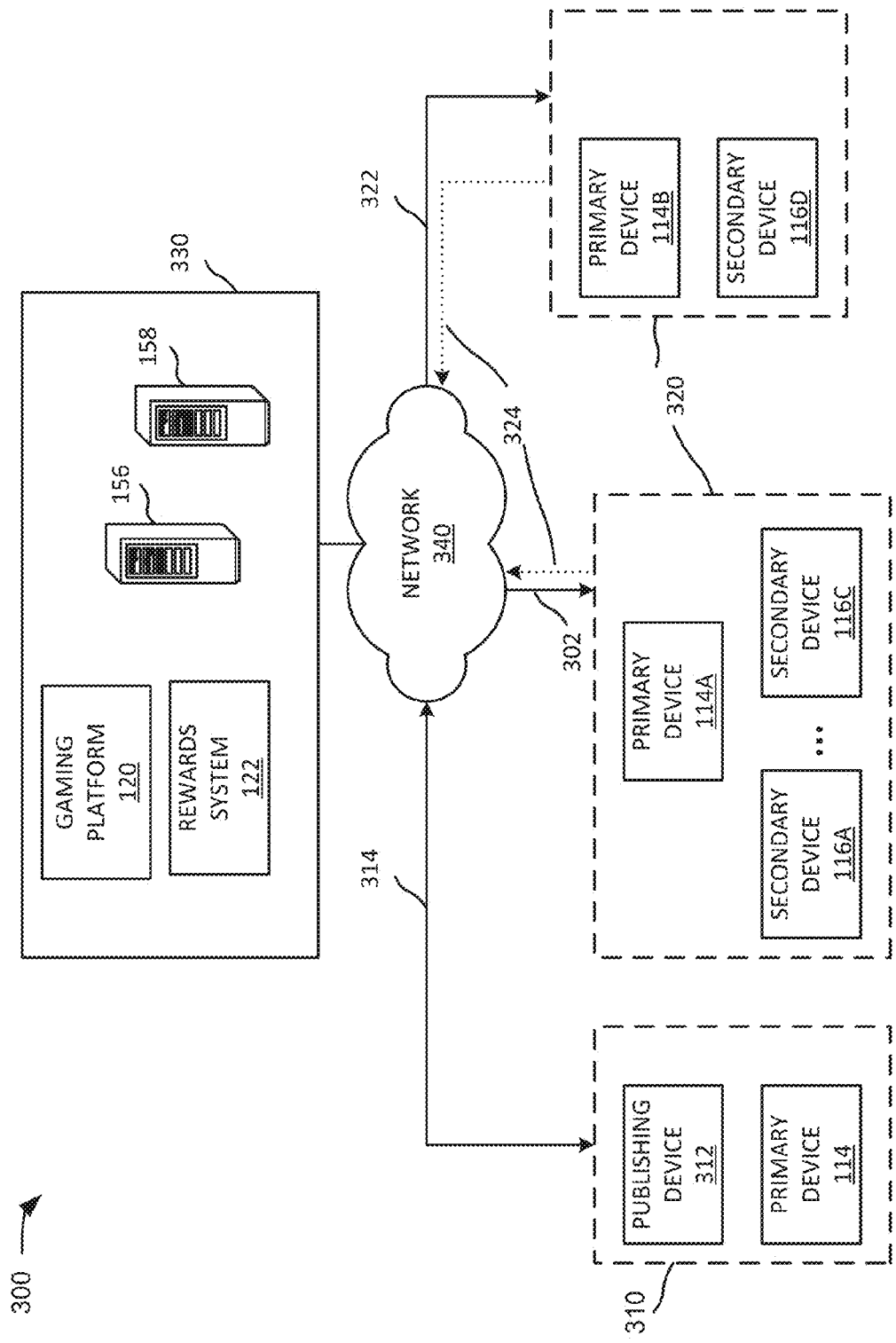
FIG. 3 depicts an exemplary secondary event publisher subscriber arrangement.

FIG. 3 depicts an exemplary secondary event publisher subscriber arrangement 300. As shown, arrangement 300 may include a plurality of end users and a secondary event support system 330. The end users may include a secondary event orchestration system 310 and a plurality of secondary event subscribing systems 320. Although particular components and devices are shown in FIG. 3, in practice, there may be more secondary event orchestration systems 310, secondary event subscribing systems 320 and secondary event support systems 330 as well as different devices or components. Also, in some instances, one or more of the components may perform one or more functions described as being performed by another one or more of the components.

Secondary event publisher subscriber arrangement 300 may be implemented to allow end users to distribute secondary content based on primary video programs associated with a service provider. Secondary event publisher subscriber arrangement 300 may allow second screen display of secondary events that include community-delivered content (i.e., from within a community based on social networks and association with the video service provider, etc.). The secondary content may be distributed via secondary events that are scheduled and distributed in association with particular primary video programs. Each publisher may be a secondary event orchestrator or master of ceremonies for the secondary events. Secondary event publisher subscriber arrangement 300 may support a multiple publisher, multiple-subscriber model. In some instances, the service provider may allow any customers of the service provider that request to register as a secondary event orchestrator and receive the tools and capability to host secondary events. In other instances, the service provider may place requirements (either temporary or permanent) in order for a customer to become a secondary event orchestrator.

Secondary event support system 330 may include portions of the system that support the provisioning of social television services from the perspective of the secondary event orchestration system 310 to the secondary event subscribing systems 320. For example, secondary event support system 330 may include gaming system 120, rewards system 122, application server 152, database server 154, social television support server 156, and social television IMG server 158. These devices and systems may support distribution of social television services in secondary event publisher subscriber arrangement 300.

Secondary event orchestration system 310 may include a system that may orchestrate a secondary event based on a primary video program. Secondary event orchestration system 310 may determine the components of the secondary event including games, question structures and information included in the secondary event, as described with respect to FIG. 8 and event orchestration console 800. Secondary event orchestration system 310 may include a publishing device 312 and a primary device 114.

Publishing device 312 may include a user device 112 that may be operated by a secondary event orchestrator. For example, publishing device 312 may include a home computer that may execute machine readable instructions via event orchestration console 800. Publishing device 312 may include hardware (e.g., processing capability, microphones, video cameras, etc.) and machine readable instructions (e.g., video editing machine readable instructions, etc.) that provide a capability of for end user that hosts a secondary event (a secondary event orchestrator) to determine components of the secondary event using electronic tools included in event orchestration console 800. Publishing device 312 may interface (directly, in association with or via social television support server 156) with gaming system 120 and/or rewards system 122 and communicate with these systems to execute portions of the secondary event.

Publishing device 312 may include capability to input a scheduled secondary event to correspond to a particular scheduled primary video program in a social secondary event IMG 500, as described with respect to FIG. 5 herein below. At the scheduled time of the primary video program, publishing device 312 may orchestrate the secondary event based on the event orchestration console 800. For example, publishing device 312 may output alternate commentary (e.g., a live audio stream), screen annotations/overlays, games, etc., that may be received by secondary event subscribing systems 320.

Secondary event subscribing systems 320 may receive display and interact with secondary events published by secondary event orchestration system 310. Secondary event subscribing systems 320 may include a primary device 114 and one or more secondary devices 116. Multiple secondary devices 116 may be associated with a single primary device 114. Each secondary device 116 may be associated with a single distinct user. For example, primary device 114 may be a set top box associated with a household and each secondary device 116 may be a personal device associated with single members of the household. In other instances, secondary device 116 may not be associated with a primary device 114 or with the service provider. In these instances, the secondary device 116 may receive limited capability to display (and not interact or interact in a reduced manner with the secondary event when compared with subscribing secondary devices 116) the secondary event.

Secondary event subscribing systems 320 may receive and interact with different secondary events. For example, customers may be watching a particular primary video program (e.g., a TV show) and may receive an identifier within the presentation of the primary video program that an interactive event (i.e., a secondary event) is available for their use on secondary devices 116 (e.g., mobile devices associated with particular members of a household). The identifier may include information that directs the secondary devices 116 to the secondary event (e.g., log in information for the secondary event, a uniform resource locator, etc.). The secondary event may include secondary content that the users can view and interact with over their secondary devices 116. For example, the secondary content may include goal oriented activities (e.g., mini-games, quizzes, polls, etc.) based on which the user may earn points (e.g., score points for correct answer) that are redeemable for predetermined incentives (e.g., the user may redeem pints for pay per view (PPV), etc.). In other, implementations secondary devices 116 may receive an alert from secondary event orchestration system 310 alerting the user to available secondary events.

According to one implementation, the end user may navigate to secondary events via the IMG and select an event. The end user may subscribe to the event, transmitting information regarding participation in the secondary event. The service provider may act as a mediator between the secondary event orchestrator and secondary event subscribing end users. In some instances, the secondary event subscribing end users may create a communal secondary event based on a secondary event issued by a particular secondary event orchestrator for a particular primary video program (in other words, the end user may create a party that includes a selected group of end users based on the secondary event). The secondary event subscribing end user may issue invitations to the communal secondary event to selected end users. The users may send the invitations via an online social network, email, short message service (SMS), etc. The selected end users may accept the invitation and, in some instances, join (or be assigned to) teams of multiple end users that participate in the communal secondary event. The user may select which of the teams to join. Multiple teams may participate in a single secondary event that is orchestrated by a particular secondary event orchestrator. Each of the multiple teams may be created by the secondary event orchestrator or by the subscribing end users. Teams may compete against each other in the secondary events with the ranking of teams (with respect to other teams) in the secondary event based on a team score. In addition, individual end users may also be ranked with respect to other end users. The communal secondary events may include competitions in which groups of end users compete against other groups of end user (e.g., family vs. family). Participating end users (i.e., party members) may receive and display the results of the communal secondary event on their primary devices 114 or their secondary devices 116. In some instances, communal secondary events may be stored for later playback (e.g., the party may be repeated in one-click).

Figure 4:
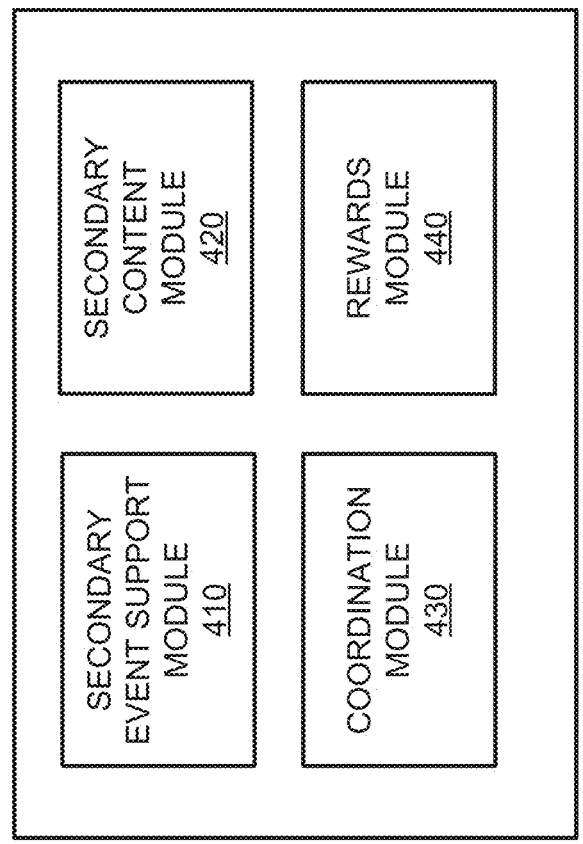
FIG. 4 is a functional block diagram of a social television support server of FIG. 1.

FIG. 4 is a diagram of exemplary functional components of social television support server 156. In one implementation, the functions described in connection with FIG. 4 may be performed by one or more components of device 200 (FIG. 2). As shown in FIG. 4, social television support server 156 may include a secondary event support module 410, a secondary content module 420, a coordination module 430, and a rewards module 440.

Secondary event support module 410 may support secondary events. The secondary events may be provided by secondary event orchestrators (or publishers or masters of ceremonies) to subscribing end users. Secondary event support module 410 may allow end users to register as secondary event orchestrators. For example, secondary event orchestrators may register (as secondary event orchestrators) by transmitting information to the secondary event support module 410. Secondary event support module 410 may allow the secondary event orchestrator to access particular functionality to present secondary events. Secondary event support module 410 may provide secondary event orchestrators with non-buffered/non-delayed stream of a primary video program. Secondary event support module 410 may provide access to downloads of machine readable language for tools associated with the presentation of secondary events, such as event orchestration console 800 described below with respect to FIG. 8. In some instances, secondary event support module 410 may enforce rules regarding a number of end users that are to receive authorization to host secondary events for particular primary video programs.

Secondary event support module 410 may facilitate the transfer of information between secondary event orchestrators, gaming system 120, rewards system 122, subscribing end users and social network in the course of secondary events. Secondary event support module 410 may be an intermediary for requests between various entities in the course of secondary events. Secondary event support module 410 may include (or interface with) an authentication mechanism to protect transfer of information between different zones (e.g., public zone 110, an external zone 130, internal zone 150). Secondary event support module 410 (or an internal service provider system associated with Secondary event support module 410) may authenticate users and user devices 102 and generate session tokens for each secondary event. Secondary event support module 410 may (or a service provider controlled service that may interface with secondary event support module 410) may manage sessions (i.e., the participation of users and user devices 112 in the secondary event) based on authentication token. Secondary event support module 410 may also support information transfers before and after the secondary events (e.g., secondary event support module 410 may allow the end user to post a completed secondary event (or a portion of the completed secondary event) to a social network website). Secondary event support module 410 may allow the end user to integrate components from the secondary events and descriptive information regarding the secondary event orchestrator into information posted on (or otherwise distributed to) social networks (e.g., the end user may post clips from the secondary events, rankings in particular secondary events (or a series of secondary events), etc.).

Secondary content module 420 may provide secondary content and support the display and additional functionality associated with secondary content. Secondary content module 420 may support the display of secondary content on secondary devices 116 (and, in some instances, embedded within the primary video programs on primary devices 114). For example, secondary content module 420 may provide the secondary content to the requesting secondary device 116 in a particular format that is compatible with the secondary device 116. Secondary content module 420 may provide particular requested secondary content that the secondary event orchestrators may use in the secondary events. For example, secondary content module 420 may provide templates, animation, etc., that may be incorporated in secondary events. Secondary content module 420 may provide the secondary content in association with (or via) gaming system 120. In some implementations, secondary content module 420 may render the secondary content and applications on application servers associated with the service provider, such as application server 152.

Secondary content module 420 may place restrictions on the usage of particular machine readable language in providing the secondary events. For example, secondary content module 420 may allow the secondary event orchestrator to use machine readable language within predetermined parameters (e.g., a predefined amount of hypertext markup language (HTML) and script within particular parameters). Secondary content module 420 may enforce security rules to prevent hacking and may also deploy filters to screen particular secondary content (e.g., to facilitate customization and personalization of the secondary content on the part of the secondary event orchestrator). Secondary content module 420 may actively filter offensive key words and links to outside content that may be posted by the secondary event orchestrator (in order to protect subscribing end users).

Coordination module 430 may coordinate timing of the secondary event to ensure display of the secondary event is synchronized with the display of the primary video program (on which the secondary event is based). Coordination module 430 may control streaming of the secondary event and the primary video program in a manner that maintains a predetermined time buffer (or difference) between the (concurrent) display of the secondary event and the display of the primary video program (at the secondary device 116). Coordination module 430 may identify a delay in broadcasting live events. Coordination module 430 may compensate for and, in some instances, leverage the embedded delay caused by intentional buffering (and other lag in delivering content over a network) for use by the secondary event orchestrator (e.g., to enable spoiler alerts, censorship by the secondary event orchestrator, etc.). Coordination module 430 may include a lag-avoidance content delivery mechanism that synchronizes the receipt of the secondary content and the primary video program. In some instances, secondary event orchestrator may receive a non-buffered/non-delayed stream to annotate broadcasted content. Coordination module 430 may later display the annotated broadcasted content at the right synchronized time on the primary device 114 of the subscribing end user or the secondary device 116 at the synchronized time. Coordination module 430 may also synchronize for programming shifts in time zones.

Coordination module 430 may inject an artificial delay on the primary device 114 of the subscribing end user (in instances in which the delay does not exist or is too short (i.e., not delayed enough)) for a viewer to listen to audio commentary or view annotation by the secondary event orchestrator. This may be implemented in instances in which the secondary event orchestrator and viewer are watching the same synchronized event and therefore there isn't enough buffer for content from the secondary event orchestrator to be sent to viewer before the event moment has already elapsed. Additionally, the secondary event orchestrators may voiceover events and make use of the delay to distribute and buffer an alternate voice audio stream through the primary device 114 or the secondary device 116 of the end user to broadcast an alternate commentary on the live events (or recorded shows). Viewers may select an option to mute their TV and to listen to the audio commentary provided by the secondary event orchestrator. According to a further implementation, coordination module 430 may allow the secondary event orchestrator to provide spoilers in live-events in instances in which the secondary event orchestrator may view the non-delayed stream ahead of (for example 10 seconds) what the viewers are currently seeing (e.g., the secondary event orchestrator may send a message within the secondary event that "You're not going to believe what just happened. You're going to laugh when you see this. Wait for it in the next X seconds").

Rewards module 440 may support a rewards system based on the secondary events. Rewards module 440 may store rewards information (e.g., accrued redeemable points from the secondary events) and coordinate the disbursement of rewards (e.g., crediting end users accounts, providing notification of available earned prizes, etc.). Rewards module 440 may communicate with rewards system 122 to provide the rewards to end users for success in interactions with secondary events.

Figure 5:
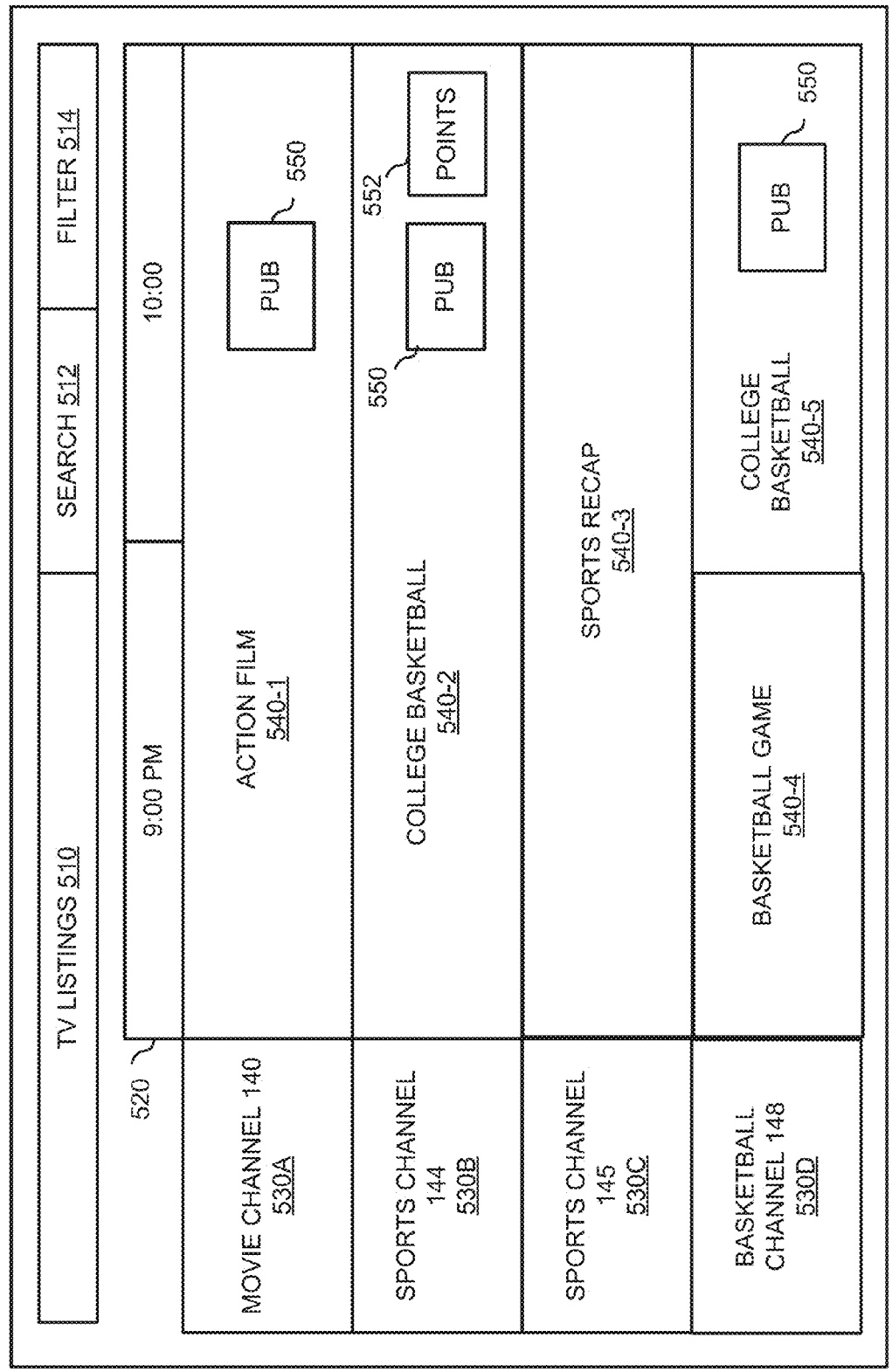
FIG. 5 is an exemplary social television interactive media guide (IMG) interface.

FIG. 5 is a diagram of an exemplary social television IMG interface 500. As shown in FIG. 5, social television IMG interface 500 may include a TV listings header 510, a search icon 512, filter icon 514, a scheduled time 520, sequential channel listings 530 (shown as movie channel 140 530A, sports channel 144 530B, sports channel 145 530C, and basketball channel 148 530D), scheduled primary video programs 540 (shown as action film 540-1, college basketball 540-2, sports recap 540-3, basketball game 540-4, and college basketball 540-5). In situations where secondary events are applicable, scheduled video programs 540 may include a publisher (pub) icon 550 (for example, shown with respect to Action film 540-1) and a points icon 552. Social television IMG interface 500 may allow the user to select video programs 540 from video IMG interface 500, based on video program related content, by inputting instructions to social television IMG interface 500 of user device 112.

Social television IMG interface 500 may be an IMG that integrates information and functionality regarding primary video programs with secondary events. Social television IMG interface 500 may include support for launch of secondary events from IMG interface 500. Social television IMG interface 500 may enable selection of a particular video program provided by the service provider (e.g., a particular channel or video on demand (VOD) program) from IMG interface 500.

TV listings header icon 510 may be a header for the TV listings. Search icon 512 may provide a capability to search the TV listings 510 to find particular scheduled video programs 540 as well as additional information associated with the scheduled video programs 540, such as secondary events, publishers of secondary events, actors, etc. Filter icon 514 may provide a capability to filter the scheduled video programs 540 based on particular criteria including whether the video programs include an associated secondary event and whether the video program 540 has an associated secondary event with points associated. Scheduled time 520 may indicate a time at which scheduled video programs 540 are to be viewed and sequential channel listings 530 may list the channels available for viewing. Social television IMG interface 500 may a time schedule listing of video programs for each channel. The schedule may be available for a predetermined time span from a current time (e.g., two weeks).

Publisher icon 550 may identify publishers for secondary events associated with a scheduled video program 540. For example, publisher icon 550 may list a number of publishers of secondary events (and correspondingly, a number of secondary events) for the scheduled video program 540. Publisher icon 550 may also identify a number of participants (i.e., subscribing end users) in secondary events for the scheduled video program 540. Publisher icon 550 may provide a capability to launch a ranking list of publishers, such as shown in FIG. 6 herein below.

Points icon 552 may identify whether redeemable points are available in association with secondary events. The redeemable points may be earned on a basis of participation or competition. The redeemable points may be earned on an accrual basis and may be redeemed for one time rewards. The service provider may provide rewards based on increased access to the service provider system (e.g., one time pay per view items, channel or series subscriptions, etc.) or reduced payments (e.g., billing credits for video service).

Figure 6:
FIG. 6 is an exemplary secondary event orchestrator ranking table.

FIG. 6 is an exemplary event secondary event orchestrator ranking table 600. As shown in FIG. 6, secondary event orchestrator ranking table 600 may include a secondary event orchestrator ranking table header 610, a ranking 620 (shown as rankings 1 (650-1) through 5 (650-5)), a secondary event orchestrator icon 630 (shown as icons 630-A to 630-E), a secondary event orchestrator name 640 (shown as Lions (640A) to Tigers (640E)), a rating 650 (shown as ratings 650-1 to 650-5), and a select icon 652 for each secondary event orchestrator.

Secondary event orchestrator ranking table 600 may be accessible via social television IMG interface 500, described above with respect to FIG. 5. Ranking table header 610 may identify that the table 600 is a ranking table for secondary event orchestrators. The rankings may be for general secondary event orchestrators or for a particular subject area (e.g., secondary event orchestrators for sports, football, entertainment events, gossip shows, etc.). In some implementations, the ranking table 600 may be open to all subscribers. In other implementations, the ranking table 600 may be limited to secondary event orchestrators associated, endorsed, or sanctioned with particular organizations.

Ranking 620 may identify a ranking of each secondary event orchestrator with respect to other secondary event orchestrators (or the highest ranked secondary event orchestrators) based on a predetermined measure, such as overall popularity, particular events, interaction, contribution and social network based ranking metrics generated within the secondary events or by user interaction with the social television IMG interface 500 (e.g., based on a number of followers or likes of the secondary event orchestrator, a number of participants in secondary events hosted by the secondary event orchestrator, etc.). The secondary event orchestrators may also be ranked based on metrics generated by users on one or more social networks or websites (e.g., mentions, referrals, likes, etc., of the secondary event and/or the secondary event orchestrator at the social networks or websites). Each of the multiple secondary event orchestrators may schedule and start their own secondary events and may have their own followers or participating users. Secondary event orchestrator icon 630 may include an image that represents the secondary event orchestrator or an organization with which the orchestrator is associated. Secondary event orchestrator name 640 may include a name (or screen name, nickname, etc.) of the secondary event orchestrator. Rating 650 may include a rating of the secondary event orchestrator on a predetermined scale (e.g., a five star scale, ten point scale, etc.). Select icon 652 may allow the end user to select (or retrieve) additional information regarding a particular secondary event orchestrator, such as a social television event orchestrator profile 700 shown in FIG. 7. In some implementations, select icon 652 may allow the user of primary device 114 to send a signal to secondary devices 116 that directs the secondary devices 116 to a particular secondary event.

Figure 7:
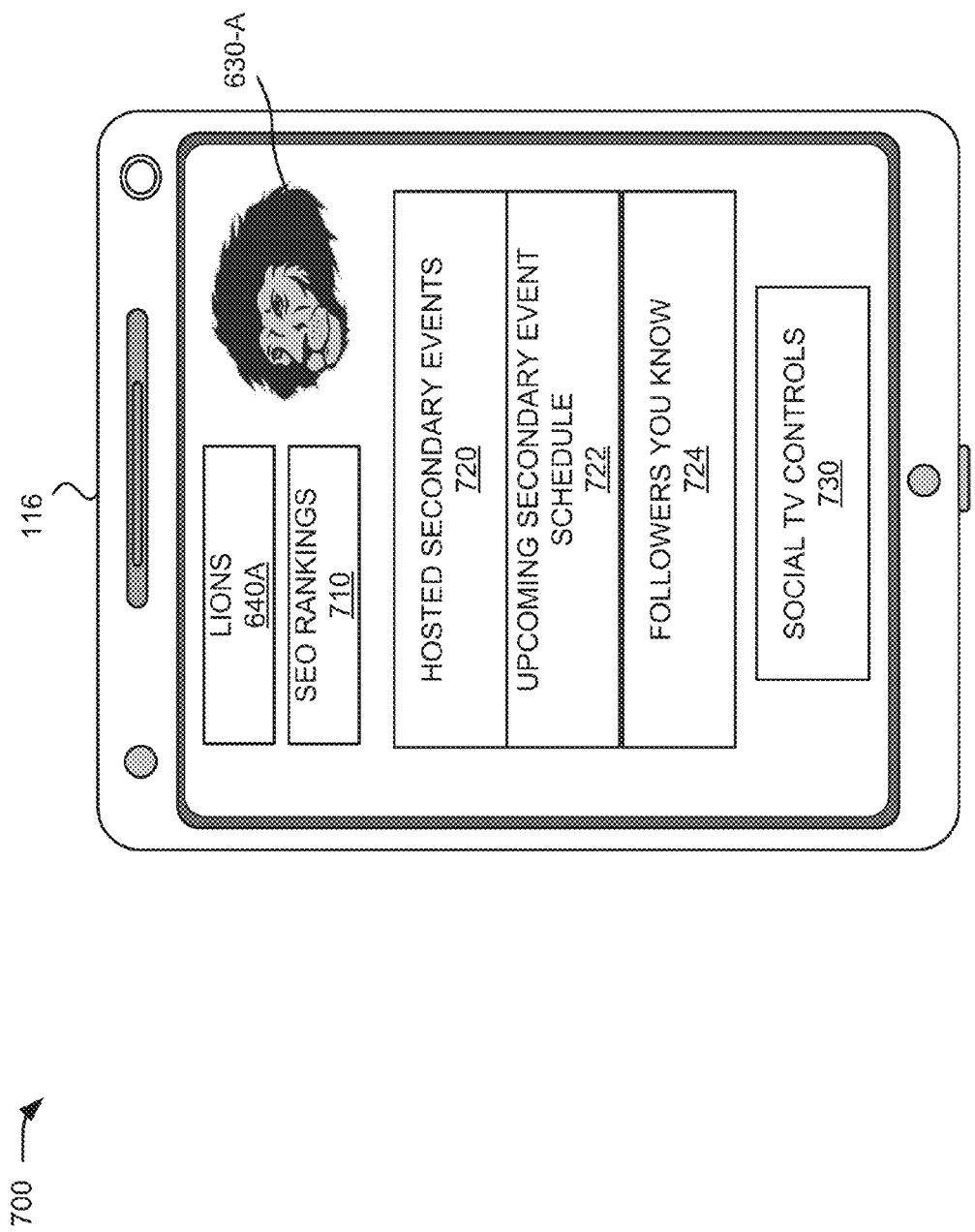
FIG. 7 is an exemplary secondary event orchestrator profile.

FIG. 7 is an exemplary social television event orchestrator profile 700. As shown in FIG. 7 social television event orchestrator profile 700 may include a name 640, secondary event organizer (SEO) rankings 710 of the secondary event organizer, hosted secondary events 720, an upcoming secondary event schedule 722, a "followers that you know" listing 724, and social TV controls 730. Although shown displayed in on secondary device 116, social television event orchestrator profile 700 may be accessed and displayed on primary devices 114.

Social television event orchestrator profile 700 may include information that identifies a particular secondary event organizer and allows an end user to make a decision whether to participate in secondary events hosted by secondary event organizer. SEO rankings 710 may include rankings for the secondary event orchestrator based on general rankings or particular groupings, genres or criteria. For example, SEO rankings 710 may include a general ranking, a football ranking, a music ranking, etc. Hosted secondary events 720 may include previous events that the secondary event orchestrator hosted. Hosted secondary events 720 may include a link to view the previous event (e.g., a uniform resource locator (URL)). Upcoming secondary event schedule 722 may include a schedule of primary video programs for which the secondary event orchestrator has scheduled secondary events. The "followers that you know" listing 724 may list followers of the secondary event orchestrator that the subscribing end user knows, Social TV controls 730 may provide a capability for the subscribing end user to select and control aspects of secondary events associated with the social television event orchestrator profile 700. For example, social TV controls 730 may allow the subscribing end user to unfollow (or follow) the particular secondary event orchestrator. Social TV controls 730 may allow the subscribing end user to send and receive texts from the particular secondary event orchestrator. The subscribing end user may also rate events associated with the particular secondary event orchestrator.

Figure 8:
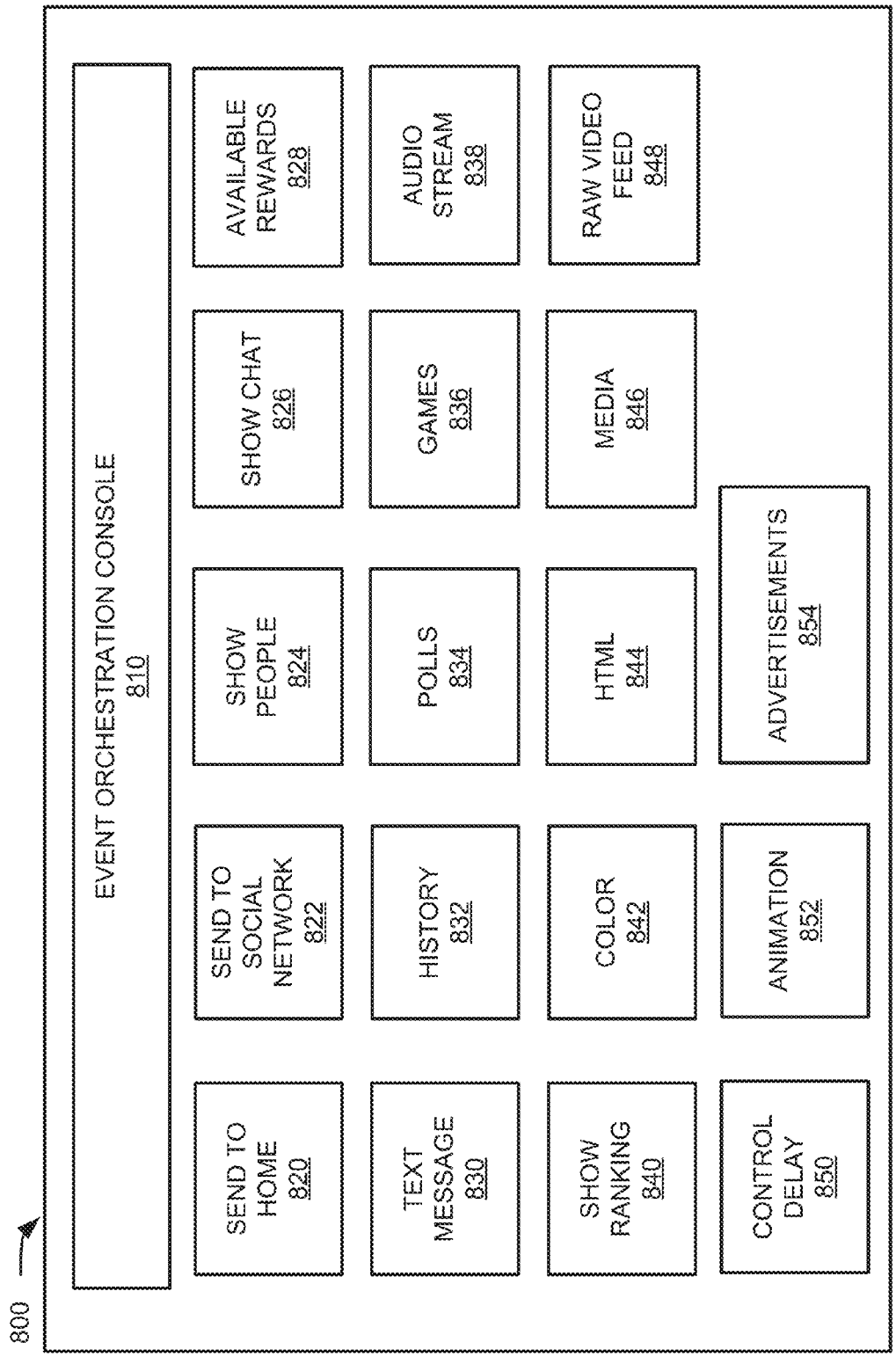
FIG. 8 is an exemplary secondary event orchestration console.

FIG. 8 is an exemplary event orchestration console 800. As shown in FIG. 8, event orchestration console 800 may include an event orchestration console header 810 and a plurality of tools (e.g., applications and options for designing secondary events) that allow the secondary event orchestrator to promote and orchestrate secondary events, such as send to home 820, send to social network 822, show people 824, show chat 826, available rewards 828, text message 830, history 832, polls 834, games 836, audio stream 838, show ranking 840, color 842, html 844, media 846, raw video feed 848, control delay 850, animation 852, and advertisements 854.

Event orchestration console 800 may include an interface and tools for orchestrating secondary events. Event orchestration console 800 may include out of the box (00B) content templates for orchestrating secondary events that may be used by the secondary event orchestrator. Event orchestration console 800 may be implemented with different types of personal computers or mobile applications to author and deliver secondary content.

Send to home 820 may allow the secondary event orchestrator to send information to a home address for the secondary event orchestrator. Send to social network 822 may allow the secondary event orchestrator to send information to social network regarding secondary events. Show people 824 may allow the secondary event orchestrator to view subscribing end users associated with a secondary event. Show chat 826 may allow the secondary event orchestrator to view chats (i.e., via chat applications) with subscribing end users. Available rewards 828 may detail rewards that the secondary event orchestrator has available to offer as rewards for successfully completing requirements associated with a secondary event (e.g., winning a competition). Text message 830 may provide text message service between the secondary event orchestrator, the subscribing end users and personnel associated with the service provider. History 832 may provide a history of secondary events including rewards, participants, competitions, etc. Polls 834 may provide polls that the secondary event orchestrator may use in creating secondary events. Games 836 may provide games that the secondary event orchestrator may use in creating secondary events. Audio stream 838 may provide the capability to insert an audio stream into the secondary event. Show ranking 840 may allow the secondary event orchestrator to show a ranking in the secondary event. Color 842 may allow the secondary event orchestrator to apply different colors in the secondary event. HTML 844 may allow the secondary event orchestrator to apply HTML to secondary events. Media 846 may provide access to media to be included in the secondary events, including media related to the primary video program. Raw video feed 848 may provide the raw non-buffered/non-delayed feed to the secondary event orchestrator and allow the secondary event orchestrator to leverage the delay and annotate their orchestrated secondary events. Control delay 850 may allow the secondary event orchestrator to control the delay between the broadcast of live video and receipt of the live video and secondary events at the subscribing end user. The secondary event orchestrator may synchronize receipt of the primary video program at a particular primary device 114 (of a first subscribing end user) and the receipt of the secondary event at a secondary device (of a subscribing end user that is associated with the particular primary device 114) based on an artificial delay. Animation 852 may allow the insertion of animation into secondary events. Advertisements 854 may provide a capability to access and embed advertisements from ad networks into the secondary event. Advertisements 854 may also allow the secondary event orchestrator to receive reports of advertisements and to be paid (in some instances on a revenue sharing basis with the service provider) based on advertisements in the secondary events.

Event orchestration console 800 may provide a capability for the secondary event orchestrator to combine voting, factoids, animation, interactive HTML games, placeholders for ads, etc., to produce a secondary event that may be keyed to a primary video program. Event orchestration console 800 may allow integration of the secondary event with ad networks for delivery and tracking (impressions/clicks). Event orchestration console 800 may allow the secondary event orchestrator to track and project revenue from secondary events. The revenue may be derived from a combination of bidding, advertisements, sponsorships, merchandise, promotions, etc., associated with the secondary event orchestrator and particular secondary events.

Event orchestration console 800 may allow the secondary event orchestrator to define a session for the secondary event. The start of the secondary event may be defined by when the secondary event becomes active through an action from secondary event orchestrator (e.g., the secondary event orchestrator posts a link). The end of the session for each end user may be defined by a predetermined time (e.g., scheduled in social television IMG interface 500), the closing of the session by the secondary event orchestrator (for one or all end users) or when an end user explicitly exits/quits the secondary event. Notifications services for the secondary event and other relevant systems, such as gaming system 120, may stop sending notifications to client device playing the event.

FIGS. 9A and 9B are exemplary second screen social television user interfaces 900 and 950. Second screen social television user interfaces 900 and 950 are displayed on secondary device 116, which may receive secondary events synchronized with primary video program at a primary device 114 (not shown in FIGS. 9A and 9B).

As shown in FIG. 9A, second screen social television user interface 900 may include a sign in section 910 for access of the subscribing end user to the secondary event on a secondary device 116. The sign in section 910 may provide an option to sign into the service provider system 102 and to select the secondary event. Service provider system 102 may then identify the end user and transfer relevant information regarding the user profile to the secondary event orchestrator. Service provider system 102 may maintain privacy of information associated with the participating end user both with respect to the secondary event orchestrator and support systems such as game system 120 and rewards system 122. In some instances, secondary device 116 may be associated with a person that is not a customer of the service provider. The user may have an option to bypass signing in to the secondary event. In that scenario, the user may receive a read-only view and may be prohibited from interaction in the secondary event (and not allowed to receive points). Alternatively, the user may sign up 920 for an account that allows the user to participate in the secondary event.

As shown in FIG. 9B, second screen social television user interface 950 may include a secondary event 960, a social network link 962, points 970 associated with the secondary event, and a rewards link 972. Secondary event 960 may be received from the secondary event orchestrator via the service provider system 102. Social network link 962 may provide social media integration that allows the subscribing end user to share the secondary events (or portions of the secondary events) on social networks. Points 970 and rewards link 972 may allow the user to track accrued points and to redeem the points for rewards, as described below with respect to FIG. 11.

Figure 10C:
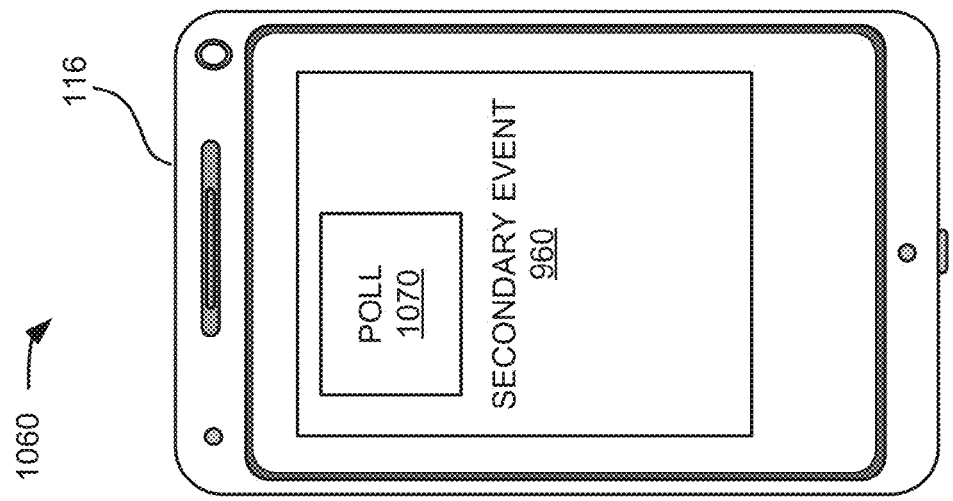
FIG. 10A-10C are exemplary secondary event content interfaces.
Figure 10B:
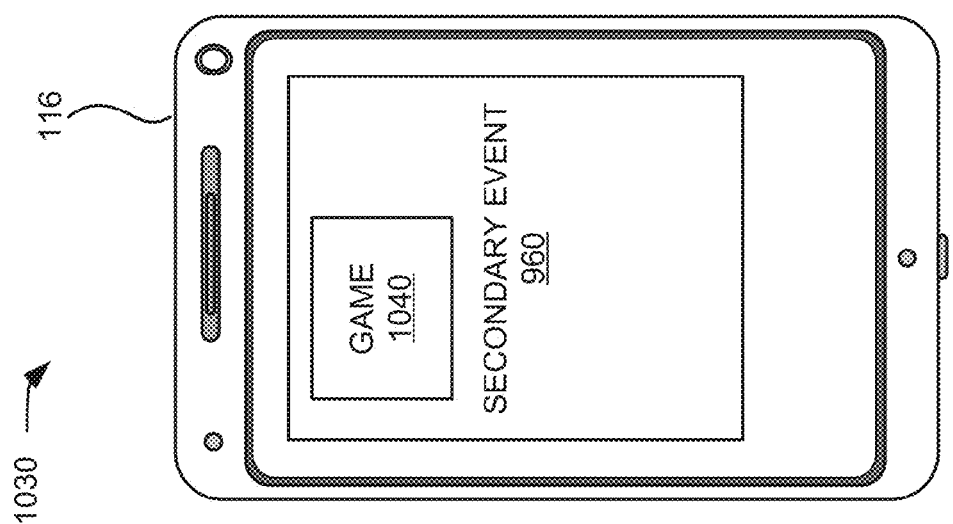
Figure 10A:
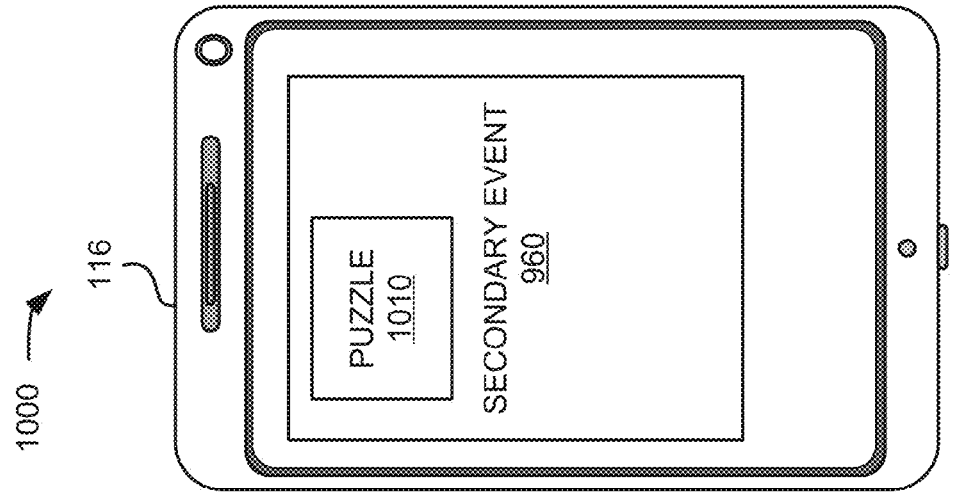

FIG. 10A-10C are exemplary secondary event content interfaces 1000, 1030, and 1060. Secondary event content interfaces 1000, 1030, and 1060 may be displayed on secondary devices 116 in the course of secondary events that are synchronized with primary video programs at primary devices 114. Alternatively, a portion or all of the information referred to with respect to secondary event content interfaces 1000, 1030, and 1060 may be displayed on an embedded social television user interface in a portion of the display of primary device 114. The secondary content module 420 may push information to secondary devices 116 after the user signs in.

As shown in FIG. 10A, secondary event content interface 1000 may include (or display) a puzzle 1010 that is provided by the secondary event orchestrator as part of the secondary event. The puzzle 1010 may be based on aspects of the primary video program. For example, the puzzle 1010 may include a jigsaw puzzle that includes sections of pictures dispersed throughout the primary video program. Alternatively, the puzzle 1010 may include a sliding puzzle.

As shown in FIG. 10B, secondary event content interface 1030 may include (or display) a game 1040 that is provided by the secondary event orchestrator as part of the secondary event. Game 1040 may be based on aspects of the primary video program. The game 1040 may include an HTML based game (e.g., HTML 5). Game 1040 may include animation that is view only or interactive (e.g., swipe an image of a soccer ball on a touch screen to score a goal). The game 1040 may be associated with the primary video program (e.g., a soccer game, television show, etc.). According to one example, the game 1040 may include a mega-reward game. The mega-reward game may be a single game extending throughout the entire primary video program. The mega-reward game may provide a requirement for increased engagement by delivering clues throughout the show (e.g., Tags). A percentage of tags may be required to win the mega-reward game.

As shown in FIG. 10C, secondary event content interface 1060 may include (or display) a poll 1070 that is provided by the secondary event orchestrator as part of the secondary event. Poll 1070 may be based on aspects of the primary video program. Polls may automatically update results based on a predetermined time interval. For example, the poll may be configured to update results after a particular amount of time (e.g., 48 hours) or at a particular time (e.g., Apr. 2, 2014). Polls (and, in some instance, trivia) may automatically publish final results of polling at the time that voting ends. The latest polls may be placed at the front of a viewing stack (i.e., based on rules for a data structure that may be used in displaying information regarding the secondary event). In some implementations, updates to information associated with the secondary event may be moved to the front of the stack based on the poll reaching predetermined metrics (e.g., updating poll results based on changes in relative rankings, number of participants in the poll, etc.).

Poll 1070 may include a preference poll or a predictive poll. A preference poll may have no right (or wrong) answer for a question and instead determine a preference of the end user. For example the poll may have a poll question "what is your favorite color?" In instances when the user selects or gives a particular answer (e.g., yellow), the results of the poll may be displayed in terms of percentages of users that have selected particular answers. (e.g., Yellow (23%), Blue (29%), etc.). The predictive poll may have an answer that is not yet known (i.e., based on a future event). For example, the predictive poll question may be "Who do you think will win Oscar for Best Picture?" In first phase, the predictive poll may open for a period of predetermined seconds/minutes (or prior to a defined cut off time). After the interval has elapsed, the predictive poll may close. The distribution of user answers may then be published (e.g., B. Gravity (24%)—Your Vote). In second phase, once the envelope is open after additional Y seconds/minutes, the correct answer is now known. The secondary event orchestrator may publish, in addition to the distribution of submitted, the now known answer.

Figure 11:
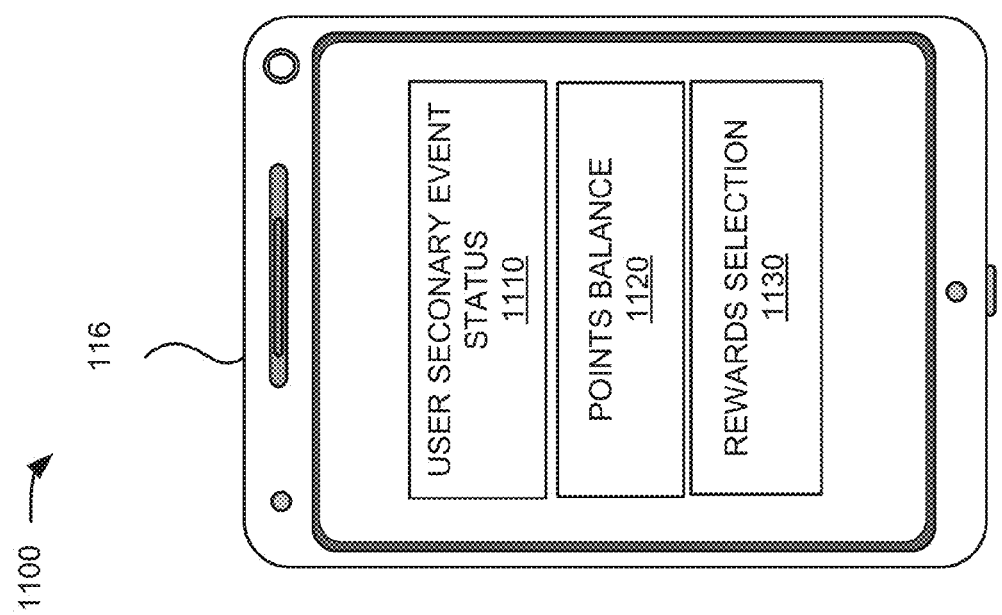
FIG. 11 is an exemplary secondary event rewards interface.

FIG. 11 is an exemplary secondary event rewards interface 1100. As shown in FIG. 11, secondary event rewards interface 1100 may include a user secondary event status 1110, a points balance 1120, and a rewards selection 1130.

Secondary event rewards interface 1100 may include information regarding rewards associated with (or earned by) a subscribing end user.

User secondary event status 1110 may identify a status of an end user with respect to secondary events. User secondary event status 1100 may indicate whether the user has (or has not) subscribed to the service provider and/or particular secondary events. User secondary event status 1110 may include a read only view for users that have not subscribed. The users that have not subscribed may engage in the secondary event while viewing the primary video program on different systems than the service provider system 102. In some instances, the end users may not be subscribers to the service provider but may purchase a subscription to one or more secondary events (or the secondary event service may be subscription based) in order to earn points.

Points balance 1120 may identify a number of points that the subscribing end user has earned. The end user may earn redeemable points based on competition, completing assigned tasks, or participation in a secondary event. Points may be earned as part of a group and may be assigned within a group based on the end user's (percentage) contribution to a result earned by the group. In some instances, the service provider may post the top ranked secondary event orchestrators (e.g., as shown in FIG. 6) and may sponsor the secondary event orchestrators. In these instances, the subscribing end users may earn points from secondary events hosted by the secondary event orchestrators.

Rewards selection 1130 may be a digital cart of rewards that the user has selected based on the redeemable points. For example, rewards selection 1130 for end users may include premium content and credit for service. In addition, secondary event orchestrators may be able to earn additional rewards (such as sponsorship) based on a ranking of the orchestrator and other metrics that indicate that the orchestrator is driving traffic towards the service provider (e.g., advertise the show as part of their second screen experience). The incentives may be designed to stimulate competition to put particular secondary event orchestrators in the top ranking positions. Sponsored orchestrators may receive internal rewards, such as bill pay, wireless data, pay per view, etc., and, in some instances financial remuneration.

Figure 12:
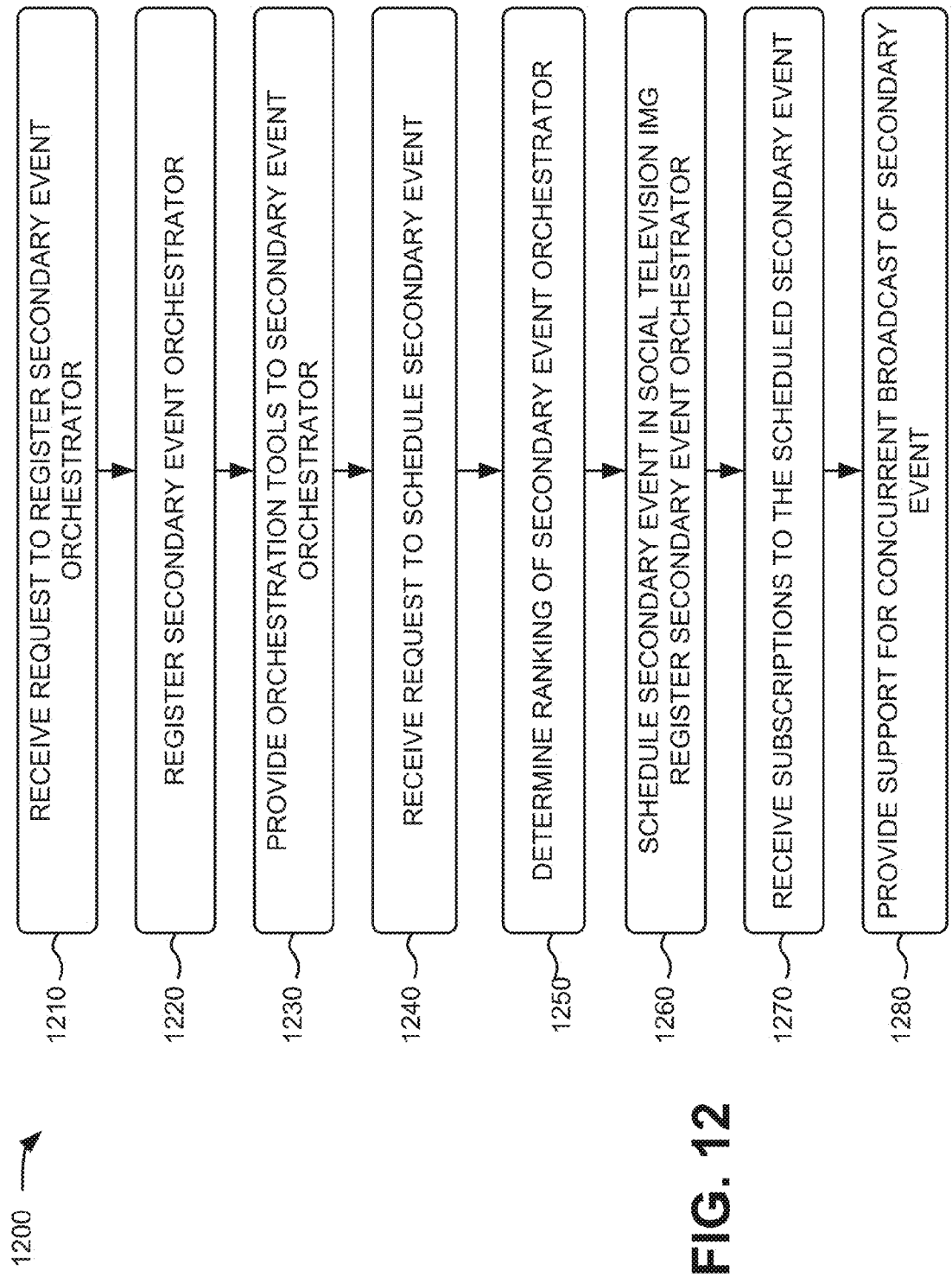
FIG. 12 is a flow chart of an exemplary process for providing secondary events associated with a primary video program based on input by a secondary event orchestrator according to implementations described herein.

FIG. 12 is a flow chart of an exemplary process 1200 for providing secondary events associated with a primary video program based on input by a secondary event orchestrator according to implementations described herein. In one implementation, process 1200 may be performed by social television support server 156. In another implementation, some or all of process 1200 may be performed by another device or group of devices, including or excluding social television support server 156.

As illustrated in FIG. 12, process 1200 may include receiving a request to register a secondary event orchestrator (block 1210). Social television support server 156 may register the end user as a social event orchestrator (block 1220). For example, social television support server 156 may request particular information regarding the end user that is applicable to hosting secondary events, such as the types of secondary events that the user may intend to host, a time zone (for hosting events) associated with the secondary event orchestrator, etc. For subsequent requests, social television support server 156 may check the registration for hosting secondary events of the secondary event orchestrator.

At block 1230, social television support server 156 may provide orchestration tools to the secondary event orchestrator (including, in some instances, machine readable instructions that defines event orchestration console 800). For example, social television support server 156 may upload the machine readable instructions to publishing device 312.

Social television support server 156 may receive a request to schedule a secondary event from the secondary event orchestrator (e.g., via the publishing device 312 or another device associated with the secondary event orchestrator) (block 1240). For example, the secondary event orchestrator may select a particular primary video program and schedule a secondary event based on the particular primary video program. The secondary event may be a concurrently scheduled event based on a scheduled primary video program.

Social television support server 156 may determine a ranking of the secondary event orchestrator (block 1250). For example, social television support server 156 may rank the secondary event orchestrator based on popularity, recent activity, endorsement by users ("likes"), etc.

Social television support server 156 may schedule the secondary event in social television IMG interface 500 (block 1260). For example, social television support server 156 may transmit a request to schedule the secondary event to social television IMG server 158, which may schedule the secondary event.

Social television support server 156 may receive subscriptions to the secondary event (block 1270). For example, end users may subscribe to the secondary event by selecting the secondary event in social television IMG interface 500.

Social television support server 156 may provide support for the concurrent broadcast of the secondary event with the primary video program (1280). For example, social television support server 156 may provide a raw video feed to the secondary event orchestrator. Social television support server 156 may receive the secondary event from the publishing device 312 and redistribute the secondary event to the subscribing secondary devices 116. Social television support server 156 may authenticate user devices 112 and a user associated with the user devices 112 for each session or secondary event. Social television support server 156 may generate an authentication session token for the secondary event. A service may manage the secondary event based on the authentication token.

Figure 13:
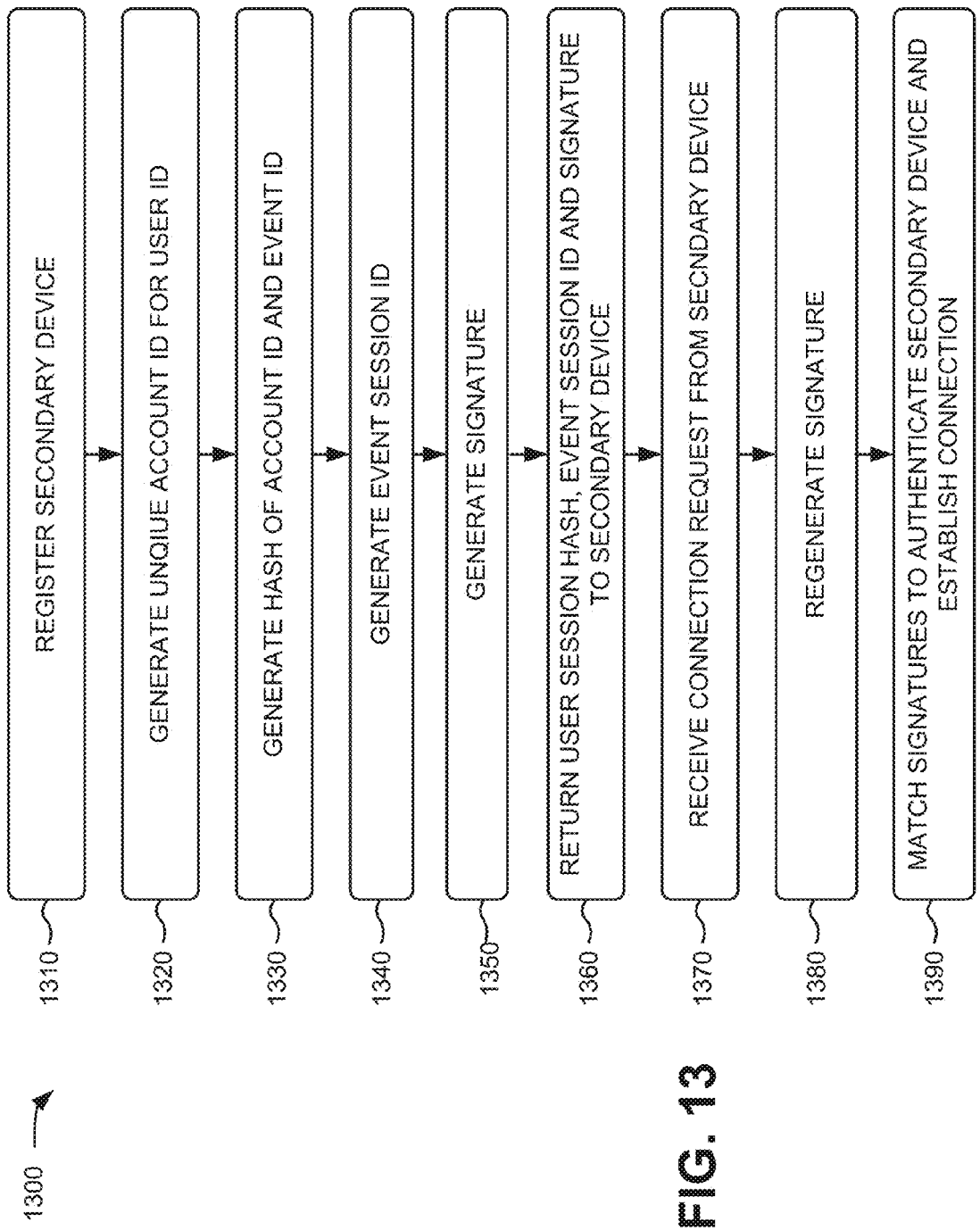
FIG. 13 is another flow chart of an exemplary process of non-replayable session and authentication with non-traceable usage (and/or device) patterns.

FIG. 13 is a flow chart of an exemplary process 1300 for non-replayable session and authentication with non-traceable usage (and/or device) patterns according to implementations described herein. In one implementation, process 1300 may be performed by profile server 160 and an external system, such as gaming system 120. In another implementation, some or all of process 1300 may be performed by another device or group of devices, including or excluding profile server 160 and gaming system 120.

External systems with which users interact (e.g., systems that are external to the service provider system 102 such as, for example, gaming system 120, rewards system 122, a messaging & distribution server) may need to authenticate session's (such as a session associated with a secondary event) for user devices 112 (e.g., mobile devices). Profile server 160 may be used as mediator to authenticate sessions for user devices 112. The service provider may need to allow external systems to authenticate users, but restrict the external systems from receiving information about the users, their devices 112 and their usage patterns across events (e.g., secondary events). Profile server 160 may allow external systems to distinguish a same user that plays the same event from multiple devices simultaneously (so as not to award points for multiple correct answers). This may enable the external systems to enforce a rule, such as consideration of only one answer per user (e.g., a first answer that is received from any user device 112 associated with the user).

At block 1310, secondary device 116 may register with profile server using a User ID, a device type, a device ID, a device operating system (OS), etc.

Profile server 160 may generate a unique account ID for any given User ID and associate other details with the unique account ID (block 1320). Profile server 160 may store the unique account ID in a user profile database.

During authentication of a user to join a specific event (e.g., a secondary event associated with a particular video program and secondary event orchestrator), profile server 160 may generate a secure hash algorithm (SHA-256) hash of concatenated account ID and Event ID (e.g., UserSessionHash) (block 1330). UserSessionHash may mask the real identity of the user, but within same secondary event, UserSessionHash may be used to link all sessions established by same user. This may allow external systems such as gaming system 120 to detect duplicate sessions. Additionally, across sessions, this approach may guarantee privacy by preventing the establishment of a timeline of all the events that a particular user has joined.

During authentication to join a specific event, profile server 160 may generate an event session ID (EventSessionID), a unique identifier which is unique even in instances of the same user joining same event (block 1340). This value may be used by profile server 160, to notify external systems (such as gaming system 120, rewards system 122) about a specific connection in instances in which there's a specific action to be taken. For example, the external system may disconnect the session if user changes password, or user logs off through secondary device 116.

The external system may generate a signature (block 1350. During authentication to join a specific event, profile server 160 may generate a signature using a shared secret key (shared between authentication server and all integrating systems), a current timed window and comma separated concatenated string of parameter values that are to be shared. For example, profile server 160 may generate a parameter string such as "eventsessionid,eventid,usersessionhash,window,sharedsecret". The format for the time window may be "YYYYMMDDHHmmww", in which YYYY represents the year, MM the month, DD represents the date, HH the hour, and MM represents the minute associated with the time window while ww is equal to (minutes of current timestamp)/(length of window). Profile server 160 may generate a SHA-256 hash for the parameter string and encode the hashed string using base64. Alternatively, profile server 160 may generate a (authentication) signature, an encrypted string using a symmetric key of a salted value of: UserSessionHash, EventSessionID, EventID, a current time stamp rounded to a next predetermined time window (e.g., a next 5-minutes window).

Profile server 160 may return the UserSessionHash, EventSessionID, and signature to secondary device 116 during registration (block 1360).

The external system may receive a connection request from secondary device 116. Secondary device 116 may attempt to connect with external system using EventSessionID, EventID, UserSessionHash and the Signature (1370).

The external system may regenerate the signature, for example, using a shared secret key in a similar manner as alternatively described with respect to block 1350 herein above (block 1380). Alternatively, the external system may generate the signature using a local copy of the symmetric Key, the Salt, the values received from profile server 160 (UserSessionHash, eventSessionID, EventID), and a current time stamp rounded to the next predetermined time window (e.g., a next 5-minute window). The external system may then compare the signature to the signature received from the authentication system. The length of the window may be variable depending on agreement between the authenticating systems.

The external system may compare the signature that it generates and the signature provided by secondary device 116 (1390). Alternatively, in instances in which the signature is received from an authenticating system, external system may compare the generated signature with the signature from the authenticating system. In either instance, if the signatures match, the external system may authenticate the secondary device 116 and establish a connection. If the signatures do not match, the external system may re-attempt regeneration of the signature using the rounded time stamp to the previous 5-minute window. This may prevent overlapping time windows.

Systems and/or methods described herein may provide a capability for secondary event orchestrators to orchestrate secondary events that may be displayed on secondary devices and synchronize the provisioning of secondary events with primary video programs that are distributed through a video service provider.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIGS. 12 and 13, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions of the invention may be implemented as a "component" or "system" that performs one or more functions. These components/systems may include hardware, such as a processor, an ASIC, or a FPGA, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A computer implemented method, comprising:
    receiving, at a processing device associated with a service provider, from a publishing user device associated with a secondary event orchestrator, identification of the secondary event orchestrator based on a status of the secondary event orchestrator as an end user of the service provider and as a provider of secondary events via the service provider;
    receiving, at the processing device, a request from the publishing user device to schedule a secondary event to be concurrently broadcast with a primary video program, wherein the secondary event is selected by the secondary event orchestrator based on the primary video program and is to be provided, by the processing device, to at least one of a plurality of secondary user devices in conjunction with presentation of the primary video program on at least one of a plurality of primary user devices, wherein the at least one of the plurality of secondary user devices is different from the at least one of the plurality of primary user devices, wherein each primary user device is associated with one or more secondary user devices, and wherein each secondary user device is associated with a single end user;
    scheduling, by the processing device, the secondary event in an interactive media guide (IMG) at a scheduled time, wherein the IMG depicts primary video programs available for presentation and, for each primary video program available for presentation, one or more secondary events available for the primary video program and a number of participants scheduled to participate in each secondary event of the one or more secondary events;
    receiving subscriptions or requests for the secondary event from the at least one of the plurality of primary user devices based on the scheduled secondary event in the IMG;
    providing, at the scheduled time, support to the publishing user device for the concurrent broadcast of the secondary event to the at least one of the plurality of secondary user devices with the presentation of the primary video program to the at least one of the plurality of primary user devices; and
    providing rewards to end users associated with the at least one of the plurality of secondary user devices based on the secondary event.

2. The computer implemented method of claim 1, wherein scheduling the secondary event further comprises:
    determining a ranking of the secondary event orchestrator with respect to at least one other secondary event orchestrator; and
    including the ranking of the secondary event orchestrator in a description of the scheduled secondary event in the IMG.

3. The computer implemented method of claim 1, further comprising:
    managing the secondary event based on a start of the secondary event and an end of the secondary event, wherein the start of the secondary event is defined by an input provided by the secondary event orchestrator and the end of the secondary event is defined by one of a prescheduled end time or a user exiting a session.

4. The computer implemented method of claim 1, wherein the secondary event includes a poll based on the primary video program.

5. The computer implemented method of claim 4, wherein the poll is one of a preference poll or a predictive poll based on a future event.

6. The computer implemented method of claim 1, wherein the secondary event includes a game based on the primary video program.

7. The computer implemented method of claim 1, wherein scheduling the secondary event further comprises:
    providing a notification of points available in association with the secondary event.

8. The computer implemented method of claim 1, further comprising:
    providing a profile of the secondary event orchestrator via the IMG.

9. The computer implemented method of claim 8, wherein providing the profile of the secondary event orchestrator further comprises:
    providing a schedule of secondary events that are to be hosted by the secondary event orchestrator.

10. The computer implemented method of claim 8, wherein providing the profile of the secondary event orchestrator further comprises:
    providing a list of followers of the secondary event orchestrator based on a particular subscribing device.

11. The computer implemented method of claim 1, further comprising:
    providing an event orchestration console for implementing the secondary event to the publishing user device associated with the secondary event orchestrator, wherein the event orchestration console includes an interface and tools for orchestrating secondary events.

12. The computer implemented method of claim 11, wherein providing the event orchestration console further comprises:

providing a content template for orchestrating the secondary event that includes at least one of voting, factoids, animation, interactive games, or placeholders for ads.

13. The computer implemented method of claim 1, further comprising:
synchronizing receipt of the primary video program at one of the at least one of the plurality of primary user devices and receipt of the secondary event at one of the at least one of the plurality of secondary user devices based on an artificial delay.

14. The computer implemented method of claim 1, further comprising:
authenticating the at least one of the plurality of primary user devices and a user associated with the at least one of the plurality of primary user devices; and
generating an authentication session token for the secondary event, wherein a service is to manage the secondary event based on the authentication session token.

15. A device, wherein the device is associated with a service provider, comprising:
a memory to store a plurality of instructions; and
a processor configured to execute the instructions in the memory to:
receive, from a publishing user device associated with a secondary event orchestrator, identification of the secondary event orchestrator based on a status of the secondary event orchestrator as an end user of the service provider and as a provider of secondary events via the service provider;
receive a request from the publishing user device to schedule a secondary event to be concurrently broadcast with a primary video program, wherein the secondary event is based on the primary video program and is to be provided, by the device, to at least one of a plurality of secondary user devices in conjunction with presentation of the primary video program on at least one of a plurality of primary user devices, wherein the at least one of the plurality of secondary user devices is different from the at least one of the plurality of primary user devices, wherein each primary user device is associated with one or more secondary user devices, and wherein each secondary user device is associated with a single end user;
schedule the secondary event in an interactive media guide (IMG) at a scheduled time, wherein the IMG depicts primary video programs available for presentation and, for each primary video program available for presentation, one or more secondary events available for the primary video program and a number of participants scheduled to participate in each secondary event of the one or more secondary events;
receive requests or subscriptions for the secondary event from the at least one of the plurality of primary user devices based on the scheduled secondary event in the IMG;
provide, at the scheduled time, support to the publishing user device for the concurrent broadcast of the secondary event to the at least one of the plurality of secondary user devices with the presentation of the primary video program to the at least one of the plurality of primary user devices; and provide rewards to end users associated with the at least one of the plurality of secondary user devices based on the secondary event.

16. The device of claim 15, wherein, when scheduling the secondary event, the processor is further configured to:
determine a ranking of the secondary event orchestrator with respect to at least one other secondary event orchestrator; and
include the ranking of the secondary event orchestrator in a description of the scheduled secondary event in the IMG.

17. The device of claim 15, wherein the processor is further configured to:
compile polls from subscribers at a voting time based on the secondary event; and
automatically publish results of the polls as the voting time ends.

18. The device of claim 15, wherein the secondary event includes a poll that updates based on a predetermined time interval.

19. A non-transitory computer-readable medium including instructions to be executed by a processor, the instructions including one or more instructions that, when executed by the processor, cause the processor to:
receive, at a device associated with a service provider, from a publishing user device associated with a secondary event orchestrator, identification of the secondary event orchestrator based on a status of the secondary event orchestrator as an end user of the service provider and as a provider of secondary events via the service provider;
receive a request from the publishing user device to schedule a secondary event to be concurrently broadcast with a primary video program, wherein the secondary event is selected by the secondary event orchestrator based on the primary video program and is to be provided, by the device, to at least one of a plurality of secondary user devices in conjunction with presentation of the primary video program on at least one of a plurality of primary user devices, wherein the at least one of the plurality of secondary user devices is different from the at least one of the plurality of primary user devices, wherein each primary user device is associated with one or more secondary user devices, and wherein each secondary user device is associated with a single end user;
schedule the secondary event in an interactive media guide (IMG) at a scheduled time, wherein the IMG depicts primary video programs available for presentation and, for each primary video program available for presentation, one or more secondary events available for the primary video program and a number of participants scheduled to participate in each secondary event of the one or more secondary events;
receive requests or subscriptions, at the publishing user device, for the secondary event from the at least one of the plurality of primary user devices based on the scheduled secondary event in the IMG;
provide, at the scheduled time, support to the publishing user device for the concurrent broadcast of the secondary event to the at least one of the plurality of secondary user devices with the presentation of the primary video program to the at least one of the plurality of primary user devices; and
provide rewards to end users associated with the at least one of the plurality of secondary user devices based on the secondary event.

20. The non-transitory computer-readable medium of claim 19, wherein the instructions further include one or more instructions that, when executed by the processor, cause the processor to:
- determine a ranking of the secondary event orchestrator with respect to at least one other secondary event orchestrator; and
- include the ranking of the secondary event orchestrator in a description of the scheduled secondary event in the IMG.

* * * * *